United States Patent [19]

Wessels et al.

[11] Patent Number: 5,262,642
[45] Date of Patent: Nov. 16, 1993

[54] SCANNING TUNNELING OPTICAL SPECTROMETER

[75] Inventors: Bruce W. Wessels, Wilmette; Ling Q. Qian, Evanston, both of Ill.

[73] Assignee: Northwestern University, Evanston, Ill.

[21] Appl. No.: 841,626

[22] Filed: Feb. 26, 1992

[51] Int. Cl.[5] .......................................... H01J 37/26
[52] U.S. Cl. ..................................... 250/306; 250/307
[58] Field of Search ............................... 250/306, 307

[56] References Cited

U.S. PATENT DOCUMENTS

| | | | |
|---|---|---|---|
| 4,646,253 | 2/1987 | Rehme et al. | 364/527 |
| 4,837,435 | 6/1989 | Sakuhara et al. | 250/306 |
| 4,902,967 | 2/1990 | Flesner | 324/158 R |
| 4,916,688 | 4/1990 | Foster et al. | 369/126 |
| 4,918,309 | 4/1990 | Beha et al. | 250/306 |
| 4,921,346 | 5/1990 | Tokumoto et al. | 250/306 |
| 4,941,753 | 7/1990 | Wickramasinghe | 374/120 |
| 4,942,299 | 7/1990 | Kazmerski | 250/306 |

Primary Examiner—Jack I. Berman

[57] ABSTRACT

A scanning tunneling optical spectrometer, and corresponding method, for measuring spectral response of a tunneling probe-sample junction over the range of optical frequencies enabling determination of characteristics of and imaging of subsurface structures with nanometer resolutions. A tunneling probe is positioned adjacent the sample with a bias voltage applied and an optical source is employed to direct modulated optical radiation onto the sample probe junction to generate photoexcited tunneling current without interference from tunneling current variations caused by thermal heating by the optical radiation. The optical source is frequency scanned over a selected frequency range and the photoexcited tunneling current is detected employing phase detection thereby permitting measurement of properties of such materials as semiconductors, buried semiconductor structures, and other organic or inorganic photoconductors. Scanning tunneling optical microscopy is provided by scanning the surface of the sample thereby permitting imaging of subsurface structures.

23 Claims, 6 Drawing Sheets

SCANNING TUNNELING OPTICAL SPECTROMETER

This invention was made with Government support under Grant Number DMR-8821571 awarded by the National Science Foundation —MRC. The Government has certain rights in the invention.

BACKGROUND OF THE INVENTION

This invention relates generally to the field of microscopic spectrographic analysis of structures of materials and more particularly to a method and apparatus for scanning tunneling optical spectroscopy and microscopy suitable for measuring properties of semiconductor materials, buried semiconductor structures and other sub-surface features of photoconductive materials.

Scanning tunneling microscopes are known in the art for providing the spatial resolution and analytic capabilities to image atoms on the surface of solid materials and permit study of a variety of material properties on the atomic scale. In a scanning tunneling microscope, a sharply pointed conductive tip and a sample surface are brought very close together, on the order of approximately a nanometer apart, and a voltage is applied across the gap between the tip and the sample surface. A tunneling current flows which is extremely sensitive to changes in gap width. The tip is scanned over the surface and a feed-back system controls the distance of the tip from the surface using the deviation of the tunneling current as the control signal. This control signal is also employed to generate a plot of the topology of the sample surface.

Such scanning tunneling microscopes have been utilized in conjunction with optical sources to study the interaction of light with solids on an atomic scale. With one technique, deformations of the sample caused by heating due to the radiation of the sample with monochromatic light is detected using a tunneling microscope structure. In this way, optical absorption properties of the sample material are measured. In another approach, scanning tunneling microscope techniques are used to measure thermoelectric junction potential between a measurement tip and the sample in response to differential absorption heating of the sample with optical radiation. Optical radiation of the tip-sample junction is also used to enhance conductivity of the sample surface for photoconductive materials, or to generate surface photo-voltage effects resulting from formation of excess electrons and holes. None of these prior art systems scans the frequency of the optical source applied to the surface. In addition, none utilize modulated optical radiation together with phase sensitive detection of the resultant modulated photoexcited tunneling current to isolate the photoexcited tunneling current. Consequently, none of these prior art techniques are capable of detecting and analyzing spectral response of photoexcited tunneling current, thereby permitting band gap and sub-band gap transition effect measurements in a semiconductor; nor can they detect such semiconductor structures as buried structures including heterojunctions, homojunctions, and quantum wells.

Accordingly, it is an object of the invention to provide a novel scanning tunneling optical spectrometer suitable for measuring properties of semiconductor structures, including buried structures such as quantum wells, homojunctions and heterojunctions.

It is another object of the invention to provide a novel method of scanning tunneling optical spectroscopy capable of detecting the spectral response of photoexcited tunneling current in materials such as semiconductors and other photoconductive organic or inorganic materials.

It is another object of the invention to provide a novel method and apparatus for scanning tunneling optical spectroscopy capable of detecting buried semiconductor structures and of determining a local band gap of semiconductor material.

It is another object of the invention to provide a novel method and apparatus for performing scanning tunneling optical spectroscopy wherein the optical source performs a frequency scan over a range of frequency to determine the spectral response of photoexcited tunneling current at the probe-sample junction.

It is another object of the invention to provide a novel method and apparatus for scanning tunneling optical microscopy capable of generating a photoexcited current image of a sample for such materials as semiconductors or other organic and inorganic photoconductive materials permitting imaging of sub-surface structures.

Briefly, according to one embodiment of the invention, a scanning tunneling optical spectrometer is provided for measuring the properties of a sample and includes a mounting stage for mounting the sample. A fine pointed probe is positionable adjacent the sample and sufficiently close to the sample to permit flow of tunneling current between the sample and the probe with an electrical bias circuit connected to the probe and the sample to generate a bias tunneling current. An optical source for radiating the sample with monochromatic radiation at a sequence of optical frequencies modulated with at least one selected modulating frequency to generate photoexcited tunneling current which is detectable without substantial interference by tunneling current variations caused by thermal heating of the sample by the radiation. Circuitry for modulating the monochromatic optical radiation with at least one selected modulating signal is provided to improve signal to noise ratio, and a detection means is provided to detect the photoexcited tunneling current substantially independent of the bias tunneling current and without substantial interference from tunneling current variations caused by thermal heating of the sample by the radiation. In another embodiment, the probe is scanned over at least a portion of the surface and the detected photoexcited tunneling current is utilized to generate an image of the sample permitting scanning tunneling optical microscopy of surface and sub-surface features.

BRIEF DESCRIPTION OF THE DRAWINGS

The invention, together with further objects and advantages thereof may be understood by reference to the following description taken in conjunction with the accompanying drawings.

DETAILED DESCRIPTION OF THE INVENTION

Figure 1:
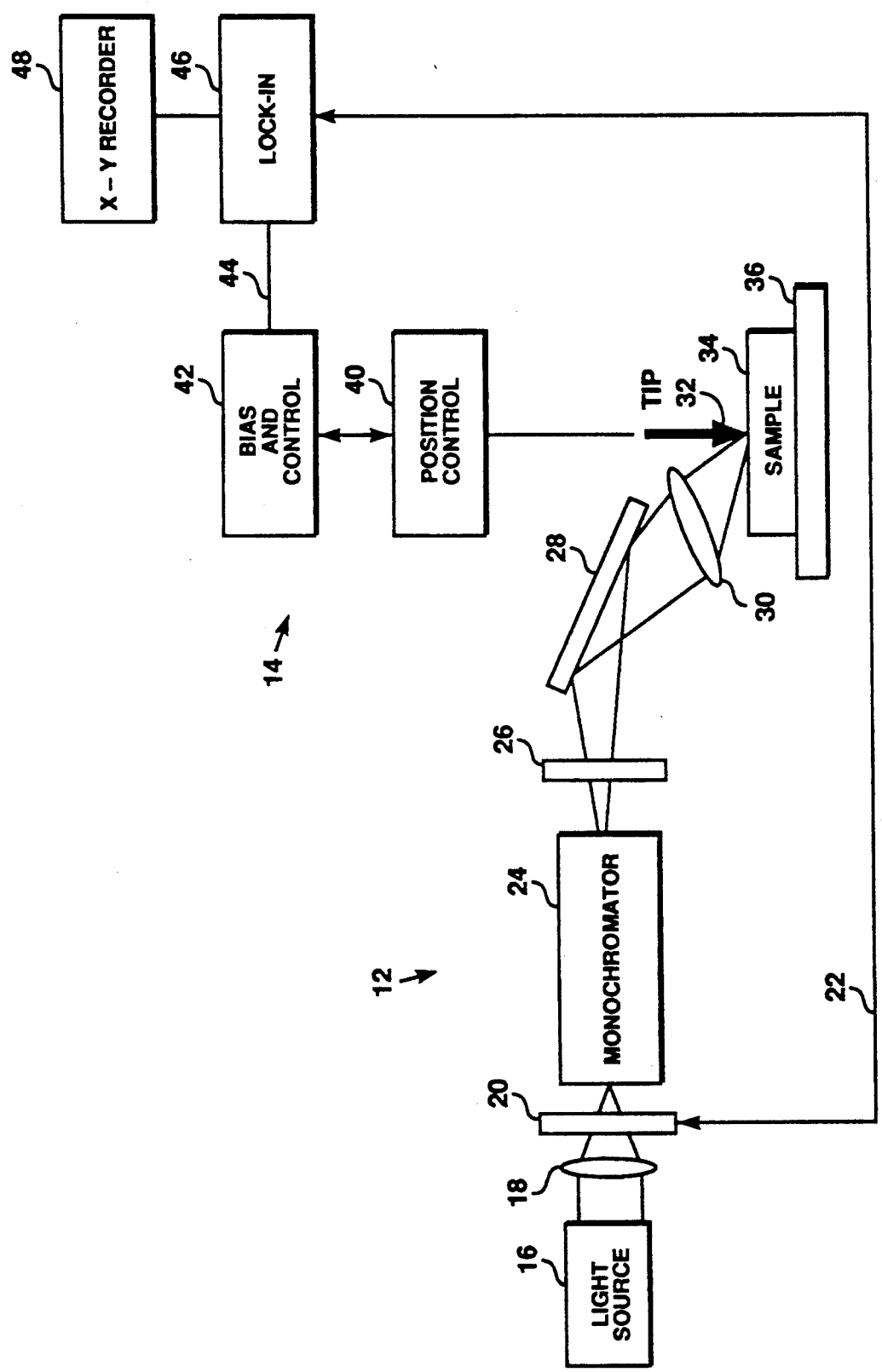
FIG. 1 is a block diagram illustrating a specific embodiment of the scanning tunneling optical spectrometer in accordance with the invention.

FIG. 1 is a block diagram illustrating a specific embodiment of the scanning tunneling optical spectrometer 10 in accordance with the invention including an optical radiation source 12 configured as shown with a conventional automated scanning tunneling microscope 14 (e.g., a Nanascope I STM marketed by Digital Instruments, Inc. of Santa Barbara, Calif.). The optical source 12 comprises tunable modulatable monochromatic radiation source such as a tunable laser, a free electron laser, a monochromator with white light source, etc. In the illustrated embodiment, the source 12 comprises white light source 16 (e.g., a 250 W. tungsten-halogen lamp) which generates a white light which is focused by a lens 18 onto a modulating device 20 (e.g., a mechanical chopper such as a Model 192 marketed by Princeton Applied Research of Princeton, N.J.), as shown. The chopper 20 modulates (e.g., interrupts) the light in response to a modulating control signal, coupled via a conductor 22 from a lock-in amplifier 46. Alternatively, the modulating control signal can be generated by the chopper circuitry and coupled to the lock-in amplifier 46 via the conductor 22.

The modulated light is directed through a monochromator 24 (e.g., a 0.25 m grating spectrometer, Model H20 marketed by Instrument SA, Inc. of Edison, N.J.) to generate modulated monochromatic output light having a frequency which can be scanned over a range including infrared, visible and ultraviolet light frequency ranges. This monochromatic light is directed through a filter system 26 to eliminate interference. The filter system 26 may optionally include variable density filters to permit control of the intensity of the output light. The intensity of the output optical radiation may also be controlled by the monochromator 24 or by controlling the intensity of the light source. The monochromatic light from the filter system 26 is focused on the junction of a fine pointed tip 32 and a sample 34 of the scanning tunneling microscope (STM) 14 by a mirror 28 and a lens 30, as shown. In one embodiment, the intensity of the light focused upon the tip-sample junction is maintained at a sufficiently low level (e.g., 100 microwatts/cm$^2$ in the illustrated embodiment) so as to minimize thermal heating of the sample 34 and tip 32 sufficiently to avoid substantial interference by thermal effects with the desired photoexcited tunneling current signal. Alternatively, the frequency of the chopper modulation is made high enough such that thermal heating effects (i.e., thermal heating expansion, contraction, etc. of the optical energy by the sample) may be substantially separated from the photoexcited tunneling effects (e.g., a frequency of 100 Hz or more in the illustrated embodiment).

The STM 14 comprises a sample mounting stage 36 for mounting the sample 34 and a control mechanism 40 for controlling the position of the tip 32 including both vertical positioning and horizontal position scanning of the tip. The control mechanism 40 coupled to a bias and control circuit 42 comprise a conventional STM feedback system. The tip 32 is coupled to the bias and control circuitry 42 which provides a bias voltage to generate a bias tunneling current and permits detection of the tunneling current which may be used as a feedback signal to the control mechanism 40 for control of the tip position. This bias tunneling current may include low frequency variations related to thermal expansion/contraction, vibrations, etc. In addition, the modulated light directed onto the tip-sample junction causes a modulated photoexcited component of tunneling current to be generated. This photoexcited tunneling current is the current caused by optical generation of current carriers created by the modulated optical radiation.

The composite tunneling current signal is proportional to the sum of the bias current and the photoexcited tunneling current and is coupled to a lock-in amplifier or phase sensitive detector 46 (e.g., Princeton Applied Research Model No. HR-8) via a conductor 44. The lock-in amplifier detects and measures the photoexcited tunneling current independent of (i.e., separated from) the bias tunneling current by phase detection using the chopper modulating control signal as a reference. Thus, the modulated photoexcited tunneling current is effectively separated from the dc and low frequency bias tunneling currents. For example, in one embodiment, the chopper modulating signal has a frequency of approximately 1 KHz which is greater than the frequency at which the feedback system of the STM is set to respond. As a consequence, the modulated signal is separated from the STM feedback tunneling signal by the lock-in amplifier by phase comparing the modulated photoexcited tunneling current to the modulating control signal. The modulating signal frequency may also be selected so that the modulated photoexcited tunneling current is at a frequency substantially higher than the rate of change of tunneling current caused by thermal deformations. In this way, the photoexcited current can be substantially separated from thermal effects of the optical radiation on the sample without limiting the intensity of the optical source to a level required to sufficiently minimize thermal effects. The detected photoexcited tunneling current is coupled to a recorder device 48 (e.g. an x-y recorder, digital storage system, etc.), as shown, to permit the photoexcited current to be recorded.

The apparatus 10 may be utilized in a scanning tunneling optical microscope mode. In this mode, the scanning tunneling microscope probe 32 is moved (i.e., scanned) over at least a portion of the surface of the sample in the conventional manner known in the scanning tunneling microscope art with the optical source maintained at a fixed frequency for the duration of the probe scan. The photoexcited current is detected using the lock-in amplifier 46 in the manner described above. The detected photoexcited tunneling current is then used to create an "image" of the sample comprising a map of the photoexcited current intensities over the portion of the sample scanned by the probe.

In the illustrated embodiment of the spectrometer 10, photoexcited currents of approximately 0.1 nA have been measured with a bias tunneling current in the range of 1–3 nA. The system may typically be operated with the STM conventional feedback system on and with the chopper modulating control signal frequency selected high enough so that the STM feedback system does not respond to the modulated component (e.g., a chopper frequency of approximately 1 KHz or more when using the Nanoscope I).

In one application, electrochemically etched tungsten tips were used for the STM tip 32 and the spectra were measured on a single crystal (111) silicon (p-type, born, doped, resistivity of 1–2ohm-cm) sample, and on a sample with an epitaxial InP layer of n-type doping, with resistivity of 0.24 ohm-cm deposited on an InP (100) Fe doped substrate. To minimize surface contamination, samples were cleaned in deionized water, methanol and acetone. The silicon sample was then etched in a 100% aqueous HF solution for one minute and rinsed in deionized water. The InP sample was etched in a 6M KOH aqueous solution for 30 minutes and rinsed in deionized water. Ohmic contacts were made to the silicon by evaporating aluminum onto the back and annealing at 500° C. in a $N_2$ atmosphere. For the InP sample, indium metal was soldered to the sample.

Figure 2:
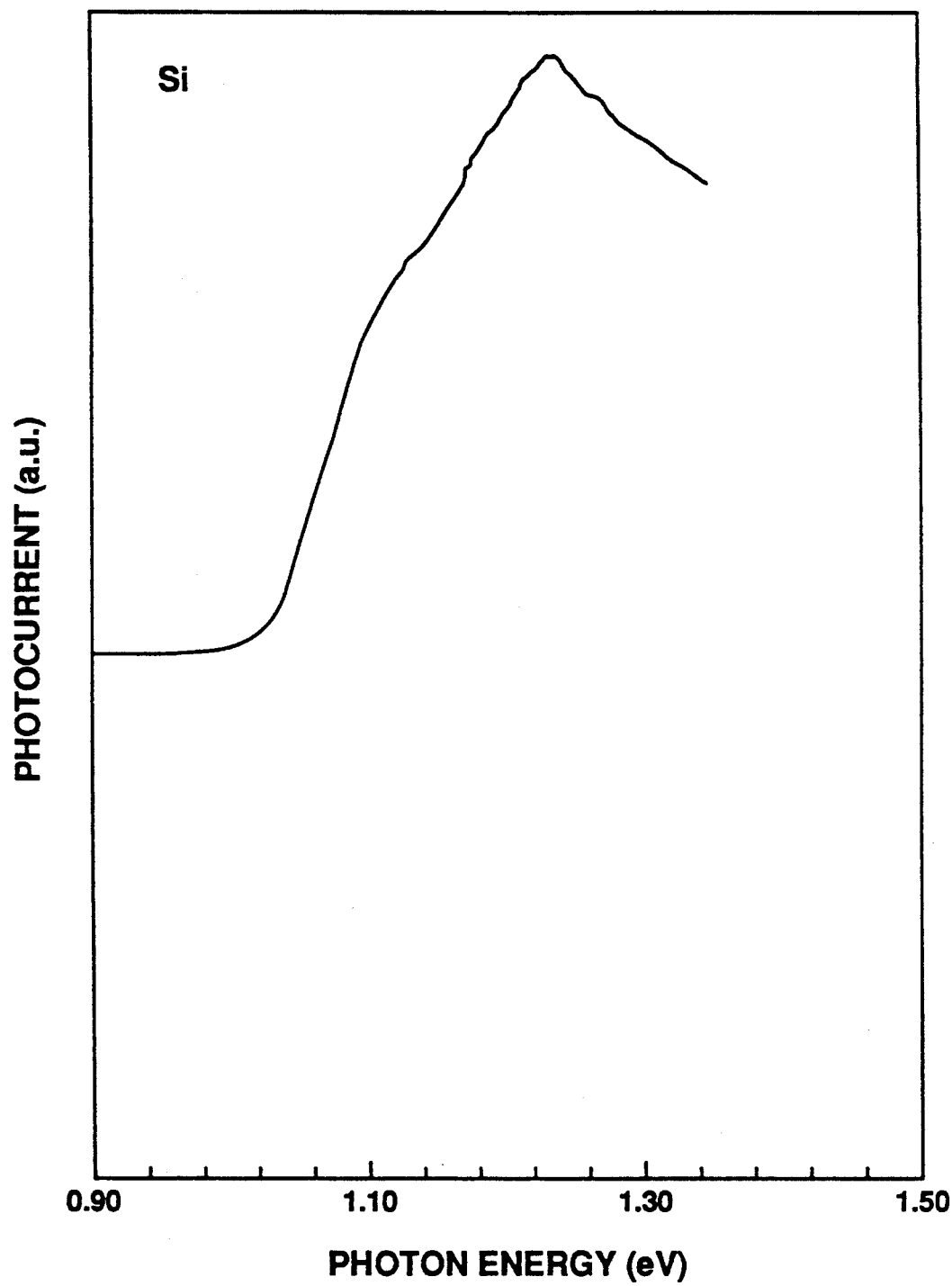
FIG. 2 is a graph of experimental results illustrating optical spectra measured in accordance with the invention for a silicon sample.

FIG. 2 is a graph illustrating the optical spectra for the silicon sample measured in accordance with the invention. The photon energy (i.e., frequency) of the optical radiation was scanned over a range from 0.80 to 1.5 eV using a 1 KHz chopper frequency, and the photo-excited current was measured and recorded over the scanned range. The measurements were made with a sample-tip forward bias voltage of 0.21 volts providing a bias (dc) tunneling current of 2.4 nA. FIG. 2 illustrates the spectrum for the silicon sample utilizing the tunneling optical spectrometer and shows a broad indirect transition with a threshold at 1.04 eV. The transition is attributed to photo-excitation of carriers across the indirect band gap.

Figure 3:
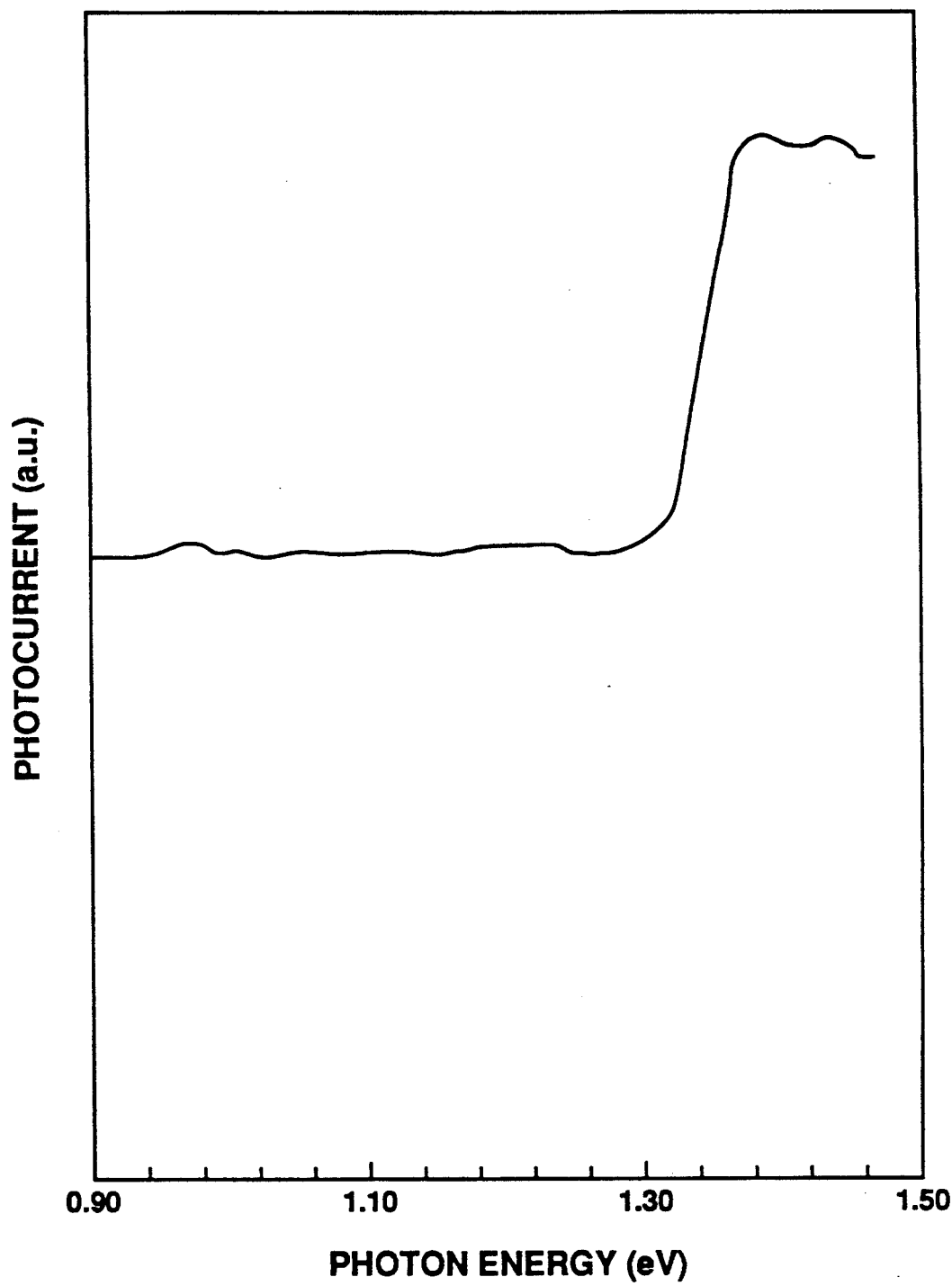
FIG. 3 is a graph illustrating optical spectra measured in accordance with the invention for an InP sample.

FIG. 3 is a graph illustrating optical spectra measurements for the InP sample using the novel scanning tunneling optical spectrometer. The measurements were taken with a tip-sample reverse bias of 1.49 volts and the optical radiation was scanned over a range of 0.80 to 1.5 eV. A sharp direct band transition at 1.34 eV is revealed.

Figure 4:
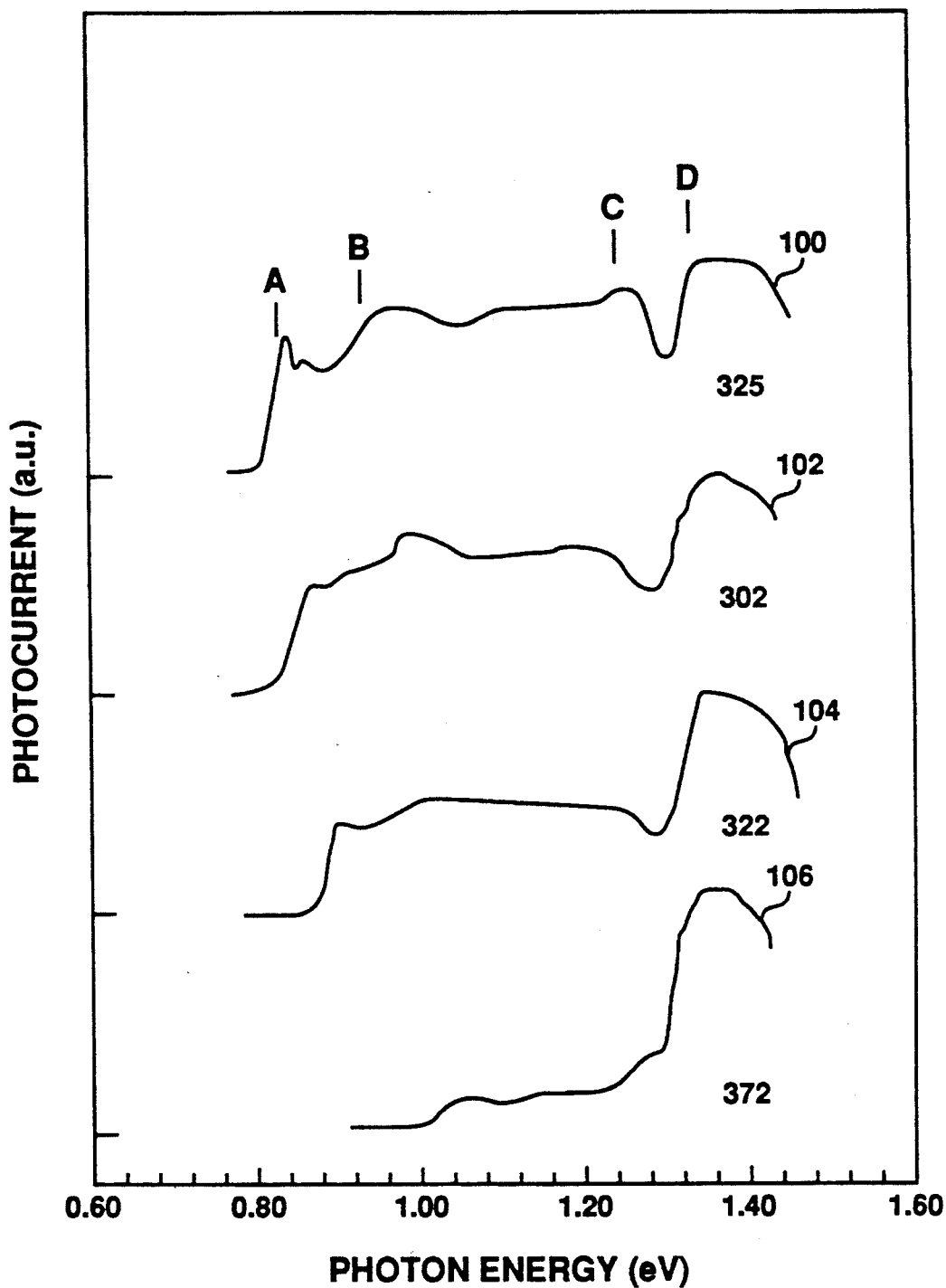
FIG. 4 is a graph of data measured in accordance with the invention illustrating spectra for four samples with quantum well structures.

FIG. 4 is a graph illustrating four sets of optical spectra measurements 100–106 for four samples of $InA_xP_{1-x}/InP$ quantum wells at 295K illustrating detection of optical transitions of quantum wells (i.e., buried layers). The samples were grown by atmospheric pressure organometallic vapor phase epitaxy on (100) semi-insulating InP substrates using trimethylindium, arsine and phosphine as reactants. The structures consist of $InAs_{0.67}P_{0.33}/InP$ with wells of a width 2.1–5.1 nanometers and an InP barrier layer of 100 nanometers. The quantum well was grown on a 150 nanometer InP buffer layer. An indium dot served as the ohmic contact to the sample. To minimize surface contamination, the samples were etched in a 6MKOH solution for 20 minutes and rinsed with deionized water. An electrochemically etched tungsten wire was used as the STM tip 32. The chopper modulating frequency was 1 KHz, well beyond the response of the scanning tunneling microscope feedback which is maintained in the constant current mode. The measured photo current for this configuration was in the range of 0–100 pA with a bias tunneling current of 1–7 nA.

The four spectra 100–106 of FIG. 4 each show several transitions which are labeled A–D. The spectrum 100 corresponds to a sample with a well thickness of 5.1 nm, spectrum 102 corresponds to a well thickness of 4.5 nm, spectrum 104 to a well thickness of 3.9 nm, and spectrum 106 to a well thickness of 2.1 nm. The transition labeled A corresponds to the E1H1 transition between the n=1 heavy hole valence band and the n=1 conduction band. As the well becomes narrower, a systematic shift in the E1H1 transition energy to higher energies is observed which is consistent with increased quantum confinement. In addition to the E1H1 transition, higher energy transitions can be observed. The transition labeled B is attributed to a lighthole band and the n=1 conduction subband (E1L1). The transition labeled D corresponds to the bandgap transition involving the InP barrier layer.

Figure 5:
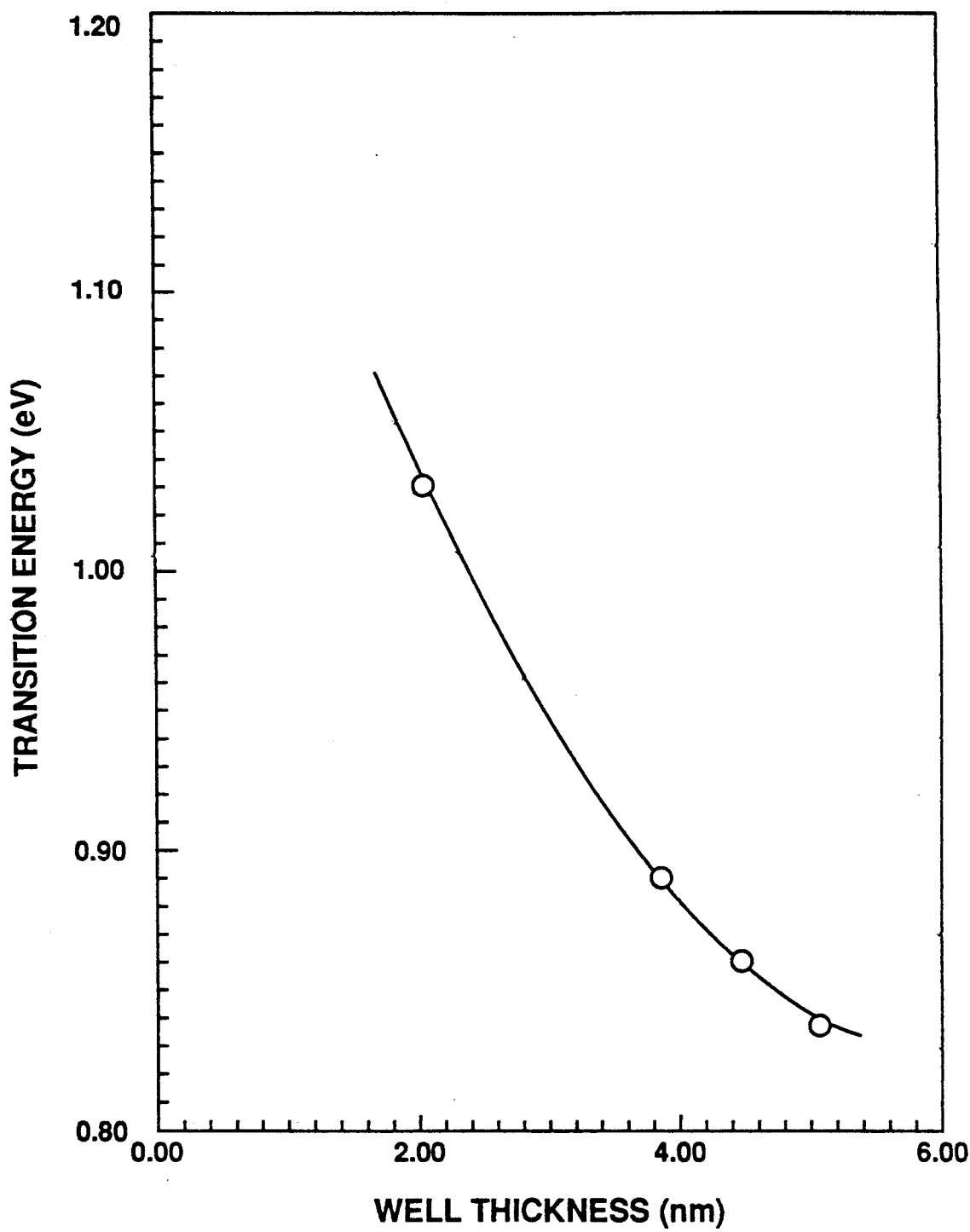
FIG. 5 is a graph of data measured in accordance with the invention illustrating the dependence of the E1H1 transition on quantum well thickness.

FIG. 5 is a graph of well thickness vis transition energy values obtained from FIG. 4 illustrating the dependence of the E1H1 transition on quantum well thickness. Calculated transition energies are shown by the solid line curve. As can be seen from the data shown in FIGS. 2–6, the novel scanning tunneling optical spectrometer permits measurement of bulk semiconductor properties and characteristics of semiconductor structures such as quantum wells with a spatial resolution on the nanometer scale.

Figure 6:
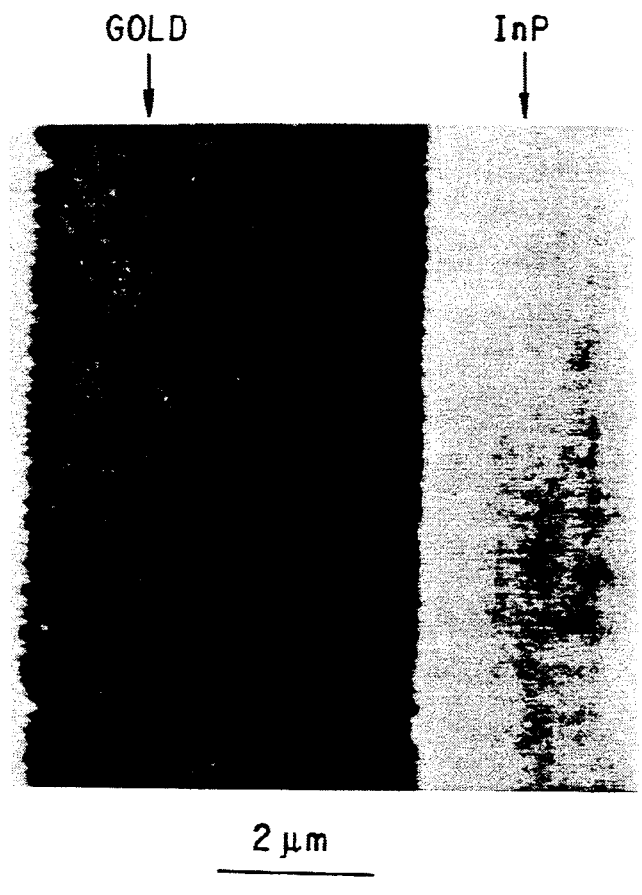
FIG. 6 illustrates imaging using the photoexcited current detected over a portion of the surface of an InP sample with a gold metal pattern according to the invention.

FIG. 6 is an image of an Fe doped semi-insulating InP sample patterned with 5 μm grounded gold lines using the novel scanning tunneling optical spectrometer 10 in a microscopy mode. The light source, to illuminate the tip-sample junction, was a ten milliwatt He-Ne laser. The image of FIG. 6 illustrates that the novel spectrometer 10 can be used to image surfaces using the photo excited current with submicron resolution.

Specific embodiments of the novel scanning tunneling optical spectrometer and corresponding method have been described for the purpose of illustrating the manner in which the invention may be made and used. It should be understood that implementation of other variations and modifications of the invention in its various aspects will be apparent to those skilled in the art and that the invention is not limited by the specific embodiments described. It is therefore contemplated to cover by the present invention any and all modifications, variations or equivalents that fall within the true spirit and scope of the underlying principals disclosed and claimed herein.

What is claimed is:

1. A scanning tunneling optical spectrometer for measuring the properties of a sample having a surface comprising:

a mounting stage for mounting the sample;

a fine pointed probe positionable adjacent to sample sufficiently close to the sample to permit flow of tunneling current between the sample and the probe;

electrical bias circuit connected to the probe and the sample to generate a bias tunneling current;

modulated optical bias source for radiating the sample with monochromatic optical radiation modulated with a modulating signal to generate photoexcited tunneling current which is detectable without substantial interference by any tunneling current variations caused by thermal heating of the sample by the radiation; and detecting means, coupled to the probe, for detecting a photo-excited tunneling current substantially independent of the bias tunneling current without substantial interference from tunneling current variations caused by thermal heating of the sample by the optical radiation.

2. The spectrometer of claim 1 wherein the optical bias source comprises a source of monochromatic optical radiation and means for modulating the monochromatic radiation with the modulating signal having at least one selected frequency.

3. The spectrometer of claim 2 wherein the source of monochromatic optical radiation comprises means for scanning the frequency of the monochromatic optical radiation over a selected frequency range.

4. The spectrometer of claim 1 wherein the optical radiation is sufficiently low in intensity to minimize thermal heating of the sample by the optical radiation sufficiently to avoid corrupting the photoexcited tunneling current.

5. The spectrometer of claim 1 wherein the modulating signal has a frequency selected to permit the photoexcited tunneling current to be substantially separable from tunneling current variations caused by thermal heating of the sample by the optical radiation.

6. The spectrometer of claim 3 wherein the optical bias source comprises means for performing a continuous frequency scan over the selected range of frequencies and further comprising means for recording the photoexcited tunneling current detected during the scanning.

7. The spectrometer of claim 6 wherein the range of frequencies is selected such that the photon energy of the optical radiation substantially corresponds to a band gap of the sample.

8. The spectrometer of claim 2 wherein the detecting means comprises a phase sensitive detector which is coupled to the means for modulating.

9. The spectrometer of claim 8 further comprising a feedback system coupled to the probe and the detecting means, and wherein the means for modulating comprises a chopper for chopping the optical radiation at a modulating signal frequency sufficiently high to avoid interfering with the feedback system.

10. The spectrometer of claim 9 wherein the modulating signal frequency is between 100 hertz and 40 kilohertz.

11. The spectrometer of claim 1 further comprising means for scanning the fine pointed probe over at least a portion of the surface of the sample and means for recording the detected photoexcited tunneling current in the form of an image thereby permitting detection and imaging of surface and buried structures.

12. The spectrometer of claim 1 wherein the sample comprises an inorganic photoconductor.

13. The spectrometer of claim 1 wherein the sample comprises an organic photoconductor.

14. A method for measurement of spectral response of photoexcited tunneling current of a sample comprising:
providing a sample to be measured;
positioning a fine tipped probe adjacent to the sample sufficiently close to the sample to permit flow of tunneling current between the sample and the probe;
biasing the sample and probe to generate tunneling current;
irradiating the sample with modulated monochromatic optical radiation to generate photoexcited tunneling current which is detectable without substantial interference from any tunneling current variations caused by the thermal heating of the sample by the monochromatic optical radiation; and
detecting the photoexcited tunneling current.

15. The method of claim 14 wherein the modulated monochromatic optical radiation is frequency scanned over a selected frequency range.

16. The method of claim 14 wherein the optical radiation is sufficiently low in intensity to minimize thermal heating of the sample by the optical radiation sufficiently to avoid interfering with the photoexcited tunneling current.

17. The method of claim 14 wherein the modulated monochromatic optical radiation is modulated with a modulating signal at a frequency selected to permit the photoexcited tunneling current to be substantially separable from tunneling current variations caused by thermal heating of the sample by the optical radiation.

18. The method of claim 14 further comprising the steps of scanning the fine tipped probe over at least a portion of the sample and recording the photoexcited tunneling current in the form of an image.

19. The method of claim 17 wherein the step of detecting further comprises separating the photoexcited tunneling current from other tunneling current components.

20. The method of claim 19 wherein the step of separating comprises phase sensitive detection of the photoexcited tunneling current using the modulating signal as a reference.

21. A scanning tunneling optical spectrometer for measuring the properties of a sample having a surface comprising:
a mounting stage for mounting the sample;
a fine pointed probe positionable adjacent to sample sufficiently close to the sample to permit flow of tunneling current between the sample and the probe;
electrical bias circuit connected to the probe and the sample to generate a bias tunneling current;
optical bias source for radiating the sample with monochromatic optical radiation to generate photoexcited tunneling current;
means for modulating the monochromatic radiation with at least one selected modulating signal having a frequency high enough to permit the photoexcited tunneling current to be substantially separated from the bias tunneling current including variation caused by thermal heating of the sample by the optical radiation; and
detecting means, coupled to the probe, for detecting a photoexcited tunneling current substantially separate from the bias tunneling current, said bias tunneling current including tunneling current variations caused by thermal heating of the sample by the optical radiation.

22. The spectrometer of claim 21 wherein the optical bias source comprises means for performing a continuous frequency scan over a selected range of frequencies and further comprising means for recording the photoexcited tunneling current detected during the scanning.

23. The spectrometer of claim 21 wherein the detecting means comprises a phase sensitive detector which is coupled to the means for modulating.

* * * * *